United States Patent Office 2,849,485
Patented Aug. 26, 1958

2,849,485

CATALYTIC ALKYLATION OF UREAS

George M. Massie, Cuyahoga Falls, Ohio, assignor to The Firestone Tire & Rubber Company, Akron, Ohio, a corporation of Ohio No Drawing. Application May 11, 1955
Serial No. 507,719

5 Claims. (Cl. 260—553)

This invention relates to an improved catalytic process for the alkylation of urea and N-alkylureas by reaction with tertiary olefins.

It is known that ureas may be reacted with tertiary olefins to yield N-alkyl and N,N'-alkylureas. The reaction is usually carried out in a medium comprising concentrated sulfuric acid or oleum, and results in the addition of alkyl groups onto the $NH_2$ groups in the ureas. For most efficient operation, under any given set of conditions, the ratio of sulfuric acid to ureas in the reaction mixture must be kept within a critical range. Inasmuch as a considerable part of the cost of the process is chargeable to the sulfuric acid employed and its subsequent neutralization, it would be highly desirable to decrease this ratio. Also, while the process as conventionally practiced is fairly satisfactory, it still leaves considerable room for improvement with regard to yield and reaction rate.

Accordingly, it is an object of this invention to provide an improved process for the alkylation of ureas with olefins.

Another object is to reduce the amount of sulfuric acid required in such a process.

Another object is to provide such a process which will give improved yields of alkylated ureas.

A further object is to provide such a process in which the reaction rate will be increased.

A still further object is to provide novel catalysts for the alkylation of urea by tertiary olefins.

SYNOPSIS OF THE INVENTION

The above and other objects are secured, in accordance with this invention, in a process in which catalytic amounts of iron salts are added to sulfuric acid-containing reaction mixtures for the alkylation of ureas with tertiary olefins, the amount of the iron salts being between 0.0003 and 0.01 gram-mols per mol of urea in the mixture. The optimum ratio of sulfuric acid to urea in the reaction mixture is thereby substantially reduced, so that considerably less quantities of sulfuric acid may be used than has heretofore been the practice.

THE ALKYLATION REACTION

The alkylation reaction to which the present invention is directed may be applied to urea itself, or to N-alkylureas. Urea itself is alkylated either to the N-monoalkyl or the N,N'-dialkylurea according to the equations (1) 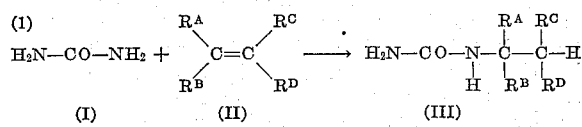

(I)    (II)    (III)

or (2) 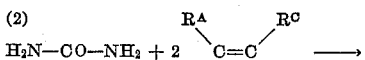

(I)    (II)

(IV)

wherein $R^A$ and $R^B$ each represents an alkyl group of from 1 to 6 carbon atoms, and $R^C$ and $R^D$ each represents hydrogen or an alkyl group of from 1 to 6 carbon atoms, with the proviso that the total number of carbon atoms in $R^A$, $R^B$, $R^C$, and $R^D$ shall not exceed 8. It will also be understood that the radicals $R^A$ and $R^C$ may be joined to form, with the C=C group, a cyclic structure. If the reaction mass contains an N-alkylurea (either from the feedstock or from reaction (1)) which is already either mono- or di-alkylated on one of its nitrogen atoms, this will be further alkylated to a greater or less extent, depending on the time of contact, to an N,N'-alkylated product according to the reaction:

(3) 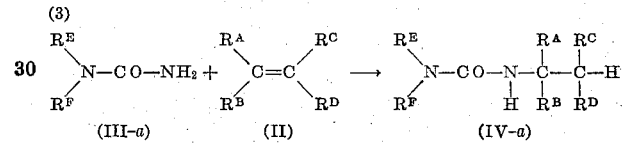

(III-a)    (II)    (IV-a)

wherein $R^E$ represents hydrogen or an alkyl group of from 1 to 10 carbon atoms, and $R^F$ represents an alkyl group of from 1 to 10 carbon atoms. It is possible that Equation 2 represents the end result of Equations 1 and 3 occurring sequentially. As to the amount of the urea or N-alkylurea (III-a) to be charged to the reaction, there is no theoretical lower limit, as any infinitesimal amount of urea charged to the reaction mass will undergo alkylation.

Referring to the N-alkylureas (III-a) which may form part or all of the feedstock used in this invention, these include for instance N-t-butylurea, N-t-amylurea, N-ethylurea, N-methylurea, N-isopropylurea, N,N-dimethylurea, N,N-diethylurea, N-methyl-N-ethylurea, N-n-propylurea, N-sec-butylurea and N-n-butylurea.

Isobutylene is the most available of the tertiary olefins utilizable in the reaction of this invention. However, any tertiary olefin containing up to 10 carbon atoms having the formula

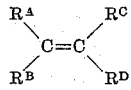

under the notation above, may be used. Suitable tertiary olefins will thus be seen to include isobutylene (already mentioned), diisobutylene, 2-methylbutene-1, 2-methylbutene-2, 2-methylpentene-1, 2-methylpentene-2, 3-methylpentene-2, 2,3-dimethylbutene-1, 2,3-dimethylbutene-2, 2-methylhexene-1, 2-methylhexene-2, 2,3-dimethylpentene-1, 2,4,4-trimethylpentene-1, 2,4,4-trimethylpentene-2, 2,4,4-trimethylhexene-1, 1-methylcyclopentene, 1-methylcyclohexene, and the like.

THE REACTION MEDIUM

The reaction medium in which the alkylation is carried out contains, as one essential ingredient, sulfuric acid, by which term it is intended to include oleum, these two substances grading continuously into each other. In general, the strength of the sulfuric acid component of the mixture may range from about 80% sulfuric acid to 60% oleum, calculated on the basis of all $SO_3$, $H_2SO_4$ and $H_2O$ present in the reaction medium. The reaction medium may also contain various other substances, either reactive or diluent in character. For instance, it has been discovered in the laboratory with which the present patentee is associated that sulfur dioxide or methyl sulfate constitute desirable constituents of the reaction mass in that they reduce the viscosity thereof and increase the quantity and reliability of the yields.

THE REACTION MIXTURE AND CONDITIONS

The reaction is most conveniently carried out by combining together all of the reaction medium ingredients except the tertiary olefin—i. e., the sulfuric acid or oleum, urea, iron salt, and any optional constituents such as methyl acid sulfate, sulfur dioxide and the like. The iron salt may be any ionic iron compound which will yield ferrous or ferric ions, the anionic portion of the salts being immaterial. Thus the catalyst may be supplied as ferrous sulfate, ferric sulfate, ferrous chloride, ferric chloride, ferrous nitrate, ferric nitrate, ferrous oxide, ferric oxide, ferric citrate, ferrous thiosulfate or the like. The ratio of sulfuric acid to urea is an important variable; under any given set of conditions (hereinafter referred to as "ground conditions") of temperature, agitation, use or non-use of methyl acid sulfate or sulfur dioxide, etc. the yield and general mode of progress of reaction are functions of this ratio. For instance, in the case of the yield, this is a function having a maximum, i. e., there will be a value of sulfuric acid/urea ratio which will give optimum yields. If all of the ground conditions be kept constant, and the iron catalysts of this invention are added to the reaction, the general mode of operation is shifted so that the same yield and general progress of reaction will be secured with a lower ratio of sulfuric acid to urea as are obtained with a higher value of this ratio in the absence. Specifically, the value of sulfuric acid/urea for the optimum yield will be shifted to a lower value by the addition of iron catalyst. It will be understood, of course, that operations in accordance with this invention will not necessarily be carried out at the conditions of optimum yield; economic balance and material costs often require a departure from the technical optimum conditions. But whatever conditions are selected for operation, those selected conditions can be achieved with a lower ratio of sulfuric acid to urea when iron catalysts are used in accordance with this invention than when the catalysts are not used. Using the catalysts of this invention, the ratio of sulfuric acid to urea will usually lie between 1.5:1 and 3:1, it being understood that these values are displaced from corresponding higher values of the ratio required for a given performance in the absence of the iron catalysts.

After the preparation of the reaction mass (except for the tertiary olefin) as aforesaid, the temperature is lowered to the desired reaction range, usually —45° to +5° C. and isobutylene is introduced and thoroughly intermingled with the reaction mass by agitation. Because of the tendency of the tertiary olefins to polymerize under the reaction conditions, they should preferably be added in increments at about the rate at which they are consumed by the alkylation reaction. Since the urea and/or N-alkylurea are the more expensive materials, and since it is usually desired to maximize production of the N,N'-alkylureas, the supply of tertiary olefins is preferably kept up until the acceptance thereof into the reaction falls to an uneconomic low rate. Generally, a reaction time of 0.5 to 2.5 hours will suffice. The reaction conditions are then terminated, and the alkylated ureas recovered by an suitable means from the reaction mass. For instance, if the reaction mass is diluted with water, the N,N'-alkylureas (IV and IV–a) will be precipitated and may be recovered by filtration. The acid filtrate will contain the N-alkylated ureas (III) containing alkyl groups on only one of the nitrogen atoms; these may be precipitated by making the solution alkaline. The isobutylene polymers entrained with these precipitates may be removed therefrom by washing with petroleum ether or similar solvents.

With the foregoing general discussion in mind, there is given herewith a detailed example of the practice of this invention. All parts and percentages given are by weight unless otherwise indicated.

*Example*

|  | Parts | Molecular proportions |
|---|---|---|
| Urea | 30 | .5 |
| Sulfuric acid (100% strength) |  | 0.9–1.1 |
|  | (Per Table I) |  |
| Sulfur dioxide (liquid) | 80 |  |
| Ferrous sulfate heptahydrate | 0 or 0.05 |  |
| Water | 75 |  |

A series of alkylation runs was made in accordmance with the above schedule, using the sulfuric acid in various proportions, and including or omitting ferrous sulfate heptahydrate, as set forth in Table I. The apparatus used in the runs comprised a flask provided with a cooling bath, a rotary agitator and an inlet tube for introducing isobutylene into the flask. In each run, the sulfuric acid was charged first, the temperature adjusted to 15° C., and the urea added and dissolved with stirring and cooling to keep the temperature in the range 15–25° C. When the addition of urea was completed, the mixture was warmed to 25–35° C. with stirring to insure complete solution of the urea. The temperature was next lowered to —15° C. and the sulfur dioxide added. The temperature was adjusted to —20° C. and the isobutylene was introduced while keeping the temperature in the range of —25° to —15° C. Introduction of isobutylene was discontinued in about 75 minutes. At this point the reaction mass was quite viscous.

The water of the recipe was then added and stirred in at —20° C., whereupon the reaction mass became quite fluid. A slight vacuum (1–2 inches of mercury) was applied, and the temperature of the mass slowly raised to 35° C., at which temperature a vacuum of 100 mm. was gradually applied. The sulfur dioxide was substantially completely removed from the reaction mass by this treatment.

The reaction mass was then removed from the vessel and readily separated into two layers, an upper oily layer of polymerized isobutylene and a lower acid layer containing the sulfuric acid and alkylated ureas. The acid layer was drawn off into 800 parts of ice water, which resulted in precipitation of the N,N'-di-t-butylurea, which was recovered by filtration and washed on the filter successively with water and petroleum ether. The aqueous filtrate was made alkaline with ammonia, resulting in the precipitation of the mono-t-butylurea, which was similarly recovered by filtration. The "nitrogen utilization" was calculated for each run as being the sum of the percentage yield of N,N'-di-t-butylurea plus one-half the percentage yield of mono-t-butylurea, the percentages being on the basis of the original urea charged. These values are set forth in Table I, and it will be seen that the addition of the iron salt shifted the maximum nitrogen ultilization, and all other corresponding states of operation, in the direction of lower amounts of sulfuric acid.

TABLE I

| | Nitrogen utilization | | | |
|---|---|---|---|---|
| Molecular proportions of $H_2SO_4$ | 0.90 | 1.00 | 1.05 | 1.10 |
| Without Fe catalyst (percent) | 75 | 86 | 92 | 85 |
| With Fe catalyst (percent) | 86 | 93 | 75 | |

From the foregoing general discussion and detailed specific example, it will be seen that this invention provides a means for achieving, with less expenditure of sulfuric acid, any given state of operation of the process of alkylating ureas with tertiary olefins. A considerable saving is thereby effected, since the sulfuric acid cannot conveniently be recovered from this process.

What is claimed is:

1. The process which comprises contacting (I) a tertiary olefin containing up to 12 carbon atoms with (II) a substance selected from the group consisting of urea and N-alkylureas in which the alkyl groups contain from 1 to 10 carbon atoms in (III) a sulfuric acid medium containing from 1.5 to 2.0 moles of sulfuric acid per mole of said selected substance, in the presence of (IV) an ionic iron salt, said tertiary olefin reacting with said selected substance to alkylate the same, and said iron salt acting to bring about a state of operation which would require a greater amount of sulfuric acid in the absence of the iron salt.

2. The process which comprises contacting (I) isobutylene with (II) a substance selected from the group consisting of urea and N-alkylureas in which the alkyl groups contain from 1 to 10 carbon atoms in (III) a sulfuric acid medium containing from 1.5 to 2.0 moles of sulfuric acid per mole of said selected substance, in the presence of (IV) an ionic iron salt, said isobutylene reacting with said selected substance to alkylate the same, and said iron salt acting to bring about a state of operation which would require a greater amount of sulfuric acid in the absence of the iron salt.

3. The process which comprises contacting (I) a tertiary olefin containing up to 12 carbon atoms with (II) urea in (III) a sulfuric acid medium containing from 1.5 to 2.0 moles of sulfuric acid per mole of said urea, in the presence of (IV) an ionic iron salt, said tertiary olefin reacting with said urea to alkylate the same, and said iron salt acting to bring about a state of operation which would require a greater amount of sulfuric acid in the absence of the iron salt.

4. The process which comprises contacting (I) isobutylene with (II) urea in (III) a sulfuric acid medium containing from 1.5 to 2.0 moles of sulfuric acid per mole of said urea, in the presence of (IV) an ionic iron salt, said isobutylene reacting with said urea to alkylate the same, and said iron salt acting to bring about a state of reaction which would require a greater amount of sulfuric acid in the absence of the iron salt.

5. The process which comprises contacting (I) isobutylene with (II) urea in (III) a sulfuric acid medium containing from 1.5 to 2.0 moles of sulfuric acid per mole of said urea, in the presence of (IV) ferrous sulfate said isobutylene reacting with said urea to alkylate the same, and said ferrous sulfate acting to bring about a state of reaction which would require a greater amount of sulfuric acid in the absence of the ferrous sulfate.

References Cited in the file of this patent

UNITED STATES PATENTS 2,548,585     Brown     Apr. 10, 1951